United States Patent [19]

Kolecki et al.

[11] Patent Number: 4,823,250

[45] Date of Patent: Apr. 18, 1989

[54] ELECTRONIC CONTROL FOR LIGHT WEIGHT, PORTABLE X-RAY SYSTEM

[75] Inventors: Norman S. Kolecki, Mentor; Thomas L. Rarick, Mayfield Hts.; Harry W. Fox, Jr., Brecksville, all of Ohio

[73] Assignee: Picker International, Inc., Highland Hts., Ohio

[21] Appl. No.: 117,793

[22] Filed: Nov. 5, 1987

[51] Int. Cl.[4] .............................................. H02M 7/00

[52] U.S. Cl. ........................................ 363/71; 363/17; 315/106; 315/308

[58] Field of Search ........................ 363/2, 3, 4, 17, 65, 363/71, 98, 132; 315/106, 107, 307, 308

[56] References Cited

U.S. PATENT DOCUMENTS

| | | | |
|---|---|---|---|
| 3,916,251 | 10/1975 | Hernandez et al. | 315/308 X |
| 4,180,761 | 12/1979 | Ochmann | 315/106 X |
| 4,215,292 | 7/1980 | Inui et al. | 315/98 |
| 4,429,356 | 1/1984 | Inui et al. | 363/86 |
| 4,439,868 | 3/1984 | Makino et al. | 315/106 X |
| 4,488,214 | 11/1984 | Chambers | 363/71 |
| 4,503,316 | 3/1985 | Murase et al. | 363/71 X |
| 4,514,795 | 4/1985 | van der Zwart | 363/71 X |
| 4,589,051 | 5/1986 | Santurtun et al. | 361/88 |
| 4,596,029 | 6/1986 | Santurtun et al. | 378/105 |
| 4,597,026 | 6/1986 | Santurtun et al. | 361/101 |
| 4,597,037 | 6/1986 | Okado | 363/41 |
| 4,614,999 | 9/1986 | Onodera et al. | 363/28 |
| 4,661,896 | 4/1987 | Kobayashi et al. | 363/24 |

FOREIGN PATENT DOCUMENTS 108336 5/1984 European Pat. Off. .

OTHER PUBLICATIONS

"A New High Form PWM GTO Inverters for High Voltage Power Supplies" by Manueco, et al., Proceedings of Powercon II, pp. 1-11, 1984.

"Designing High Power SCR Resonant Converters for Very High Frequency Operation" by D. Chambers, Proceedings of Powercon, 1982.

"A New High Frequency Controlled X-Ray Generator System with Multi-Pulse Wave Shape" by W. Weigl, J. For Radiological Eng. vol. 1, No. 1 pp. 7-19.

Section 7 Power Supplies, Machine Design, May 13, 1982, pp. 238-246.

Radio Handbook, 21st Edition, by William Orr, 1978, pp. 23.15-23.19.

*Primary Examiner*—Patrick R. Salce
*Assistant Examiner*—Kristine Peckman
*Attorney, Agent, or Firm*—Fay, Sharpe, Beall, Fagan, Minnich & McKee

[57] ABSTRACT

A power supply line has two to four lead wires which are selectively connectable with terminals (10*a*–10*d*) of a transformerless AC-to-DC converter (A). The lead wire interconnection scheme is selected (FIGS. 1A–1D) in accordance with whether the line signal is single phase or three phase and whether the line voltage is 220 or 440 volts. The AC-to-DC converter produces a 620 volt DC, signal across its outputs (26, 28). A first inverter (B) converts to a pulsed AC signal and applies it across opposite phased primary windings (46*a*, 46*b*) of a step up transformer (C). Two pair of alternately phased secondary windings (48*a*–48*d*) and rectifier bridges (50, 52) provide a high voltage DC bias across a cathode (54) and an anode (56) of an x-ray tube (D). A summing junction (66) compares a voltage sensed across the x-ray tube with a reference voltage and generates a voltage deviation signal. A deviation signal adjustment algorithm (68) adjusts the deviation signal in accordance with a ratio of the selected tube operating current and voltage. A pulse width modulator (82) controls the first inverter to control the duty cycle of the pulsed AC signal in accordance with the adjusted deviation signal. A second summing junction (102) compares sensed tube current with a reference tube current to produce a tube current deviation signal in accordance with the deviation therebetween. A second pulse width modulator (106) and a second inverter (F) apply a pulsed AC signal whose duty cycle varies in accordance with the deviation between the sensed and reference currents through the filament of the cathode.

24 Claims, 4 Drawing Sheets

ELECTRONIC CONTROL FOR LIGHT WEIGHT, PORTABLE X-RAY SYSTEM

BACKGROUND OF THE INVENTION

The present invention relates to the art of x-ray tube control. It finds particular application in conjuntion with light weight, portable x-ray systems and will be described with particular reference thereto. However, it is to be appreciated that the present invention may also find application in other x-ray systems and other control applications, particularly those in which large amounts of electrical power are controlled with precision.

Most x-ray systems are designed for a fixed installation. Because the characteristics of electrical power available to the unit are known, the unit is constructed with appropriate components. Some systems are designed to accomodate either of two line voltages, such as either 220 or 440 volts. The multiple line voltage systems include an appropriate step-up or step-down transformer with multiple taps to convert either line voltage level to a preselected internal operating voltage. However, transformers, particularly transformers which handle the large amounts of power required by an x-ray system are heavy. The weight is particularly disadvantageous in a portable system.

Adapting an x-ray system to operate on single phase versus three phase current or vice versa is more difficult. Commonly, it is necessary to replace the whole power module. For a portable system, carrying multiple power modules again adds weight and requires additional space. Further, replacement of the modules with each move requires additional man-power and time to set up the system.

Most commonly, x-ray systems employ silicon controlled rectifiers to switch power to the x-ray tube at a relatively low frequency. One drawback of SCR switching systems is that they require bulky commutation circuitry to turn the devices off once energized. Moreover, radical load variations can cause miscommutation. Varying loads can affect the circuit characteristics of SCR switched systems reducing the dynamic output voltage range. Because gate turn-off thyristors require large gate currents to turn off, complex gate drive circuitry is required.

Some x-ray generators have been provided which have transistor switching. Often, the switching frequency of the transistors is varied to vary the output voltage by using the resonant characteristics of the load. However, generators that change pulse repetition rate tend to exhibit significant ripple amplitude variations in the output x-ray beam.

In accordance with the present invention, a new and improved high voltage control circuit is provided which overcomes the above referenced problems and others.

SUMMARY OF THE INVENTION

In accordance with one aspect of the present invention, a radiographic control circuit is provided for radiographic tubes which have an anode and a cathode. A voltage control means applies a controllable voltage across the anode and cathode. A filament current means applies an oscillating current through a filament of the cathode.

In accordance with yet another aspect of the present invention, the control circuit includes a transformerless AC-to-DC converter which converts either single or three phase line signals having any one of at least two different voltage levels to a preselected DC voltage. An inverter is connected with the AC-to-DC converter for generating a pulsed AC signal therefrom, for application to a step up transformer. The step up transformer is operatively connected through rectifier bridges with the tube anode and cathode for applying an operating voltage thereacross.

In accordance with another aspect of the present invention, the radiographic tube control circuit includes an AC-to-DC converter and an inverter for producing a pulsed AC signal, a step-up transformer has a first primary winding across which the pulsed AC signal is applied and a first pair of secondary windings wound in the opposite direction.

In accordance with a more limited aspect of the invention, the step up transformer further includes a second primary coil in series with the first primary coil and a second pair of oppositely wound secondary coils. The first pair of secondary windings are operatively connected with the anode and the second pair are operatively connected with the cathode through rectifier bridges.

In accordance with a yet more limited aspect of the present invention, a Faraday shield is provided adjacent the secondary winding pairs.

In accordance with another aspect of the present invention, the control circuit includes a power source and an inverter for producing an AC signal, which is rectified and filtered for application to the x-ray tube. A voltage sensing means senses the tube voltage. A comparing means compares the sensed tube voltage with a reference voltage and produces a deviation signal indicative of the deviation therebetween. The deviation signal altering means alters the deviation signal in accordance with a selected tube current. The altered deviation signal controls a pulse width modulator which adjusts the duty cycle of the pulsed DC signal in accordance therewith.

In accordance with a more limited aspect of the invention, the deviation signal adjusting means adjusts the deviation signal in accordance with a ratio of the selected tube current to the reference tube voltage.

One advantage of the present invention is that it is readily adaptable to either single phase or three phase incoming power.

Another advantage of the present invention is that it is smaller and lighter than conventional x-ray tube control circuits.

Yet another advantage of the present invention is that it accurately controls tube power. Compensation is readily made for variations in load and line voltage.

Still further advantages of the present invention will become readily apparent upon reading and understanding the following detailed description of the preferred embodiments.

BRIEF DESCRIPTION OF THE DRAWINGS

The invention may take form in various parts and arrangements of parts and in various steps and arrangements of steps. The drawings are only for purposes of illustrating a preferred embodiment and are not to be construed as limiting the invention.

DETAILED DESCRIPTION OF THE PREFERRED EMBODIMENT

Figure 1A:
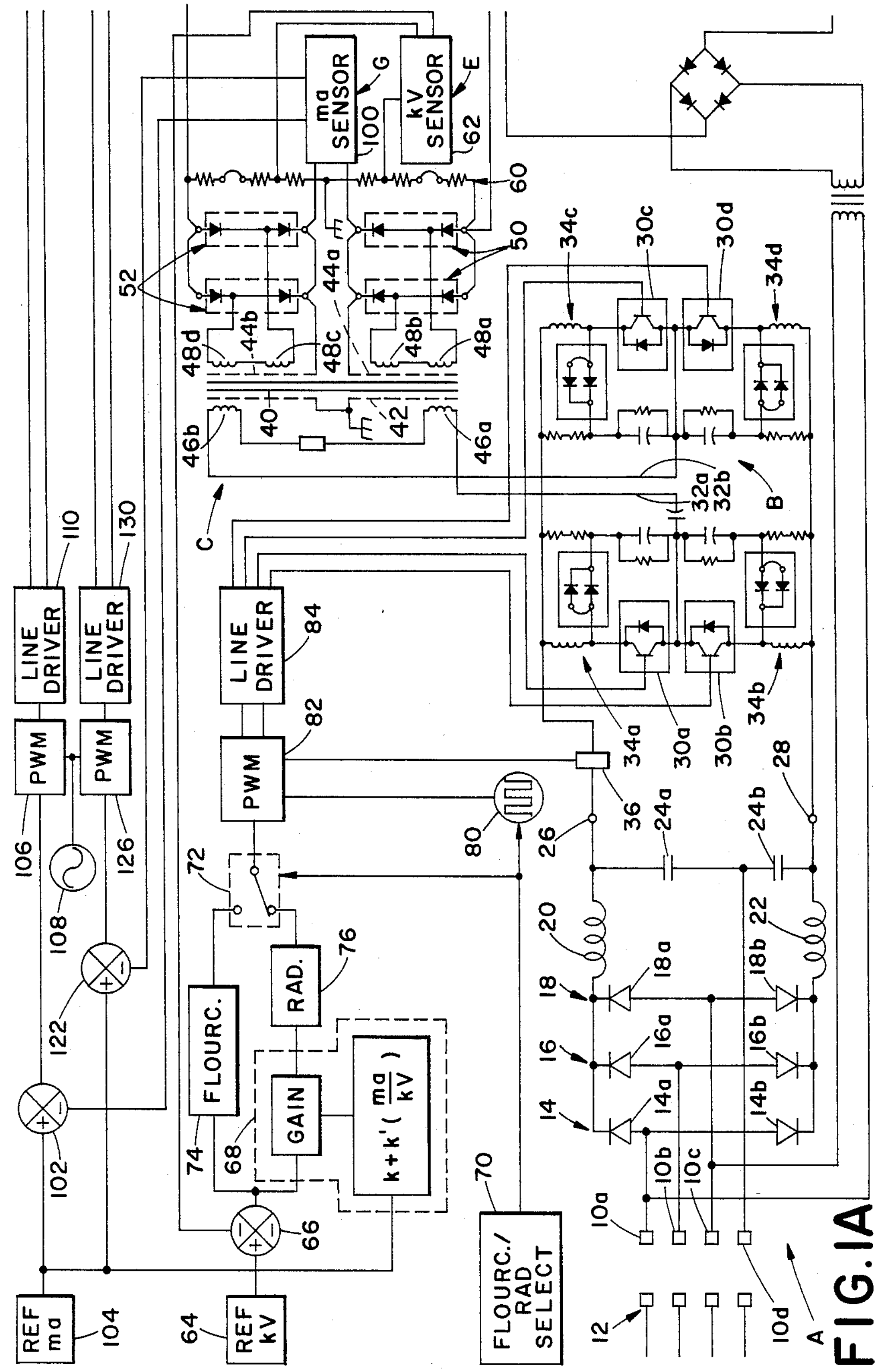
FIGS. 1A and 1B is a diagrammatic illustration of an x-ray tube control circuit in accordance with the present invention.
Figure 1B:
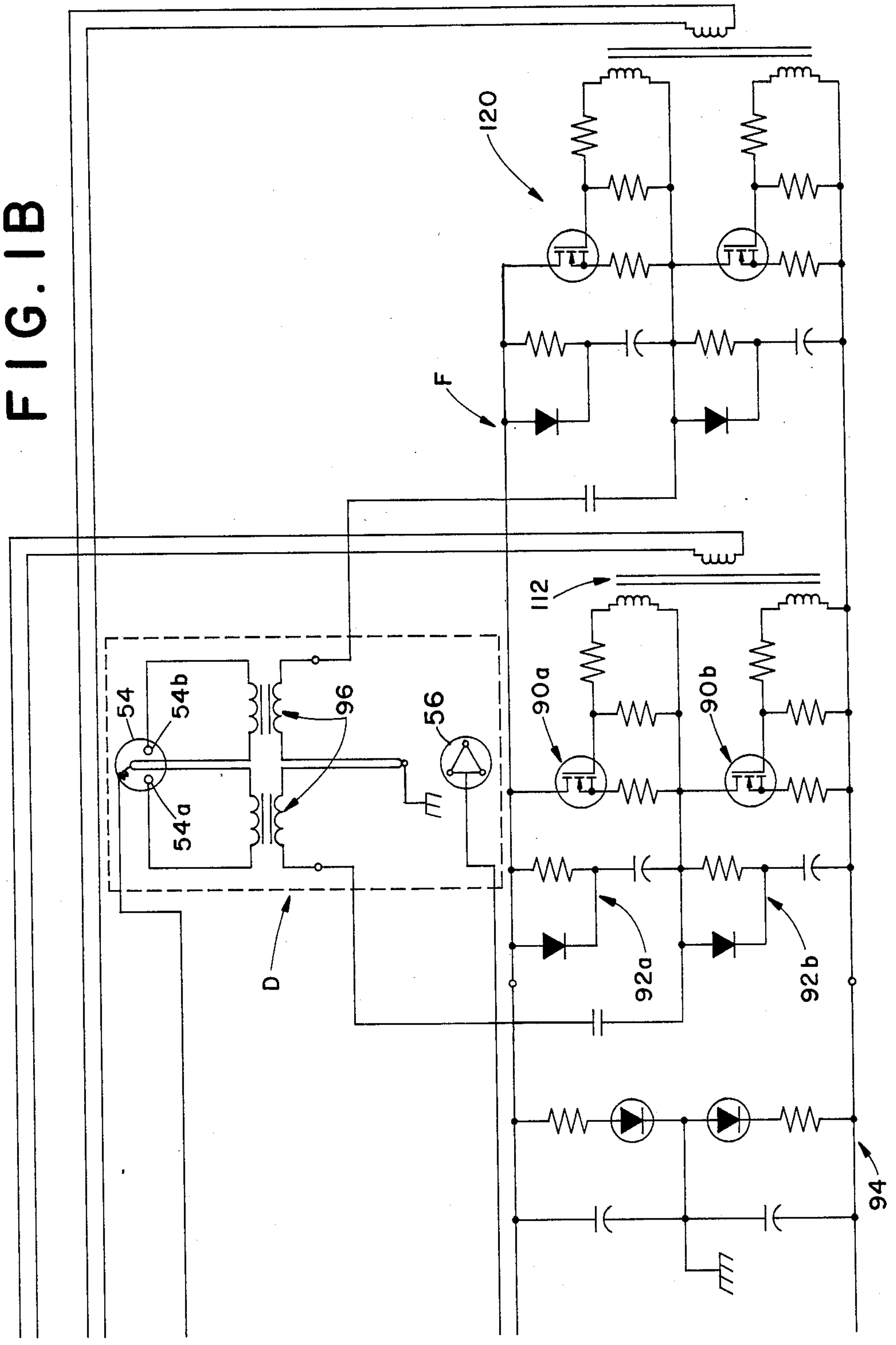

With reference to FIGS. 1A and 1B, an AC-to-DC converter A converts 220 or 440 single phase or three phase line voltage to 620 volts DC. A first inverter B generates 10 kHz pulse trains from the 620 volts DC. A step-up transformer C steps up the voltage of the pulse train to a preselected operating potential and applies it after rectification and filtering across the anode and cathode of an x-ray tube D. A voltage feedback circuit E determines conformity of the voltage applied across the x-ray tube to a preselected voltage level and adjusts the duty cycle of the pulse train accordingly. A second inverter F applies a high frequency modulation current to the x-ray tube filament to control the tube current. A tube current feedback control circuit G adjusts the duty cycle of the pulses of the second inverter in accordance with the deviation between the actual tube current and a preselected tube current.

The AC-to-DC converter A, without the use of transformers, enables either single phase or three phase voltage to be converted from AC to DC. Moreover, the AC-to-DC converter enables the DC voltage to be either doubled or held the same, without the use of transformers.

The AC-to-DC converter includes four coupling points or posts 10*a*, 10*b*, 10*c* and 10*d* for selective interconnection with up to four leads of an incoming power line 12. Preferably, the posts or connections points include quick connect electrical couplings to which wires or leads can be interconnected manually, without tools. The first connection post 10*a* is interconnected between a pair of diodes 14*a*, 14*b* in a half bridge arrangement. Analogously, the second contact point 10*b* is connected to a second half diode bridge 16 and the third contact point 10*c* is connected to a third half diode bridge 18. The cathode and anode terminals of the half diode bridges are mutually interconnected with a pair of chokes or coils 20, 22. The fourth connection or contact point 10*d* is connected between a pair of capacitances 24*a*, 24*b*. The capacitances are connected with the chokes or coils 20, 22 to define a positive output terminal 26 and a negative output terminal 28.

Figure 1C:
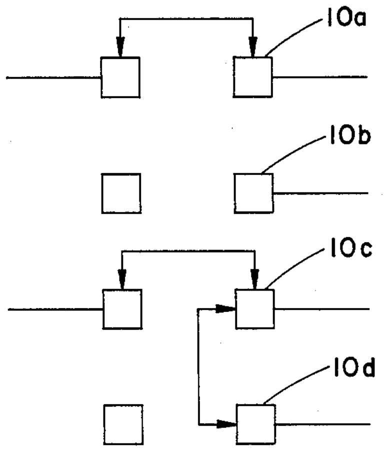
FIG. 1C illustrates a jumper lead interconnection for a single phase line current whose voltage is to be doubled.
Figure 1D:
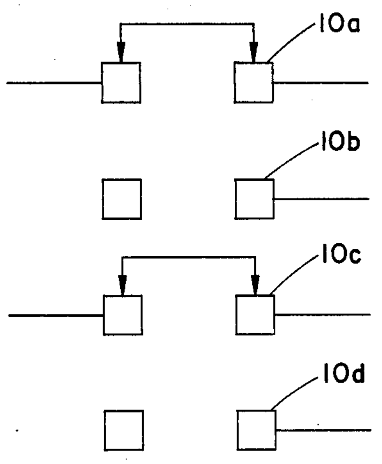
FIG. 1D illustrates a jumper lead diagram in which single phase line voltage is not doubled.

With reference to FIG. 1C, when the power lines 12 are carrying single phase voltage which is to be doubled, the power line 12 commonly has two leads 12*a*, 12*c*. One of the leads is connected with the first terminal post 10*a* and the other with the third terminal post 10*c*. To double the voltage, the fourth terminal post 10*d* is connected with the third post 10*c*. With reference to FIG. 1D, when the power lines have single phase power and the voltage is not to be doubled, the two leads are connected to two of terminal posts 10*a*, 10*b*, and 10*c*.

Figure 1E:
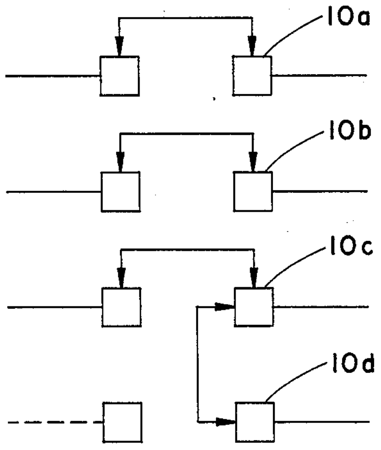
FIG. 1E illustrates a jumper lead arrangement in which three phase line power is to have its voltage doubled.
Figure 1F:
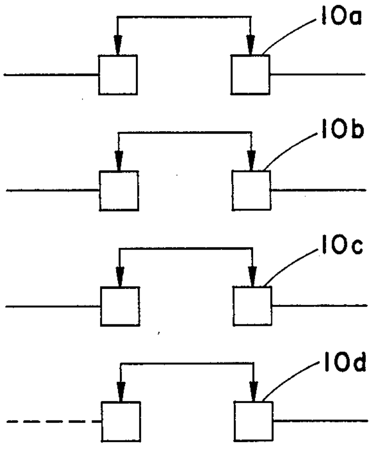
FIG. 1F illustrates a jumper lead arrangement in which three phase line power does not have its voltage doubled.

With reference to FIG. 1E, a three phase power line commonly has three power leads 12*a*, 12*b*, 12*c* and may have a neutral lead 12*d*. The three power leads 12*a*, 12*b*, and 12*c* are connected with terminal posts 10*a*, 10*b*, and 10*c* respectively. If the voltage is to be doubled, posts 10*c* and 10*d* are interconnected. With reference to FIG. 1E, if the three phase received power is not to be doubled, the neutral line 12*d* may be interconnected with post 10*d*.

Referring again to FIGS. 1A and 1B, the first inverter B includes four triple Darlington transistors with clamping diodes 30*a*, 30*b*, 30*c*, and 30*d* connected in a full bridge arrangement. The transistors are gated in alternate pairs to provide pulses of AC voltage on inverter outputs 32*a*, 32*b*. Snubber networks 34*a*, 34*b*, 34*c*, and 34*d* dissipate power which would otherwise be dissipated by the transistors. The transistors are gated with less than a 50% duty cycle, preferably less than 35–40% duty cycle, such that series connected pairs of transistors are never both gated conductive simultaneously. A current, overload sensing circuit 36 protects the inverter against serially connected transistors being gated conductive simultaneously. If the sensed current from the AC-to-DC converter into the inverter increases into a range which indicates that both serially connected transistors are gated concurrently or other short circuit failure modes, the overload protection circuit 36 turns off the inverter.

The step-up transformer C receives the pulsed AC signals from the first inverter B and boosts their voltage. The transformer includes a core 40 which is surrounded by an inner Faraday shield 42 and an outer Faraday shield 44. The inverter is connected to a pair of primary windings 46*a*, 46*b* connected in series on the core. Four secondary windings 48*a*, 48*b*, 48*c*, 48*d* are wound in alternating directions. That is, windings 48*a* and 48*d* are wound in one direction and 48*b* and 48*c* are wound in the other. By orienting windings 48*a* and 48*b* in series, an effective voltage doubling is achieved. By orienting series connected windings 48*a* and 48*b* in opposite directions, the series connection between the two is facilitated. This enables a 75 kv output to be achieved with a transformer insulated for 37½ kV. Because transformer insulation increases exponentially with voltage, two oppositely wound secondary windings requires only about a quarter of the insulation as a single secondary winding.

The Faraday shields 42, 44 isolate the secondary coils from the primary to return transformer capacitive currents back to the mid-point of the secondary.

A first diode bridge 50 including diodes 50*a*, 50*b*, 50*c*, and 50*d* is connected with the secondary coil segments 48*a* and 48*b*. A second diode bridge 52 including diodes 52*a*, 52*b*, 52*c*, and 52*d* is connected with the secondary coils 48*c* and 48*d*. The negative going end of the second diode bridge 52 is connected with a cathode 54 of the x-ray tube D. A positive going end of the first bridge 50 is connected with an anode 56 of the x-ray tube. The negative going or floating ground end of the first diode bridge 50 is connected with a portion 44*a* of the outer Faraday disposed adjacent the primary winding 46*a* and the second windings 48*a*, 48*b*. The negative or floating ground end of the second diode bridge 52 is interconnected with a second outer Faraday shield portion 44*b*.

The first inverter sense circuit E includes a resistive bridge 60 across the diode bridges 50 and 52 such that a voltage proportional to the voltage across the cathode and anode of the x-ray tube D appears across the resistive bridge and portions thereof. A voltage sensing means 62 senses the voltage across the resistive bridge 60 or a preselected portion thereof. A reference voltage means 64 provides a reference voltage indicative of the voltage that the voltage sensing means 62 should sense. The reference voltage means 64 is preferably adjustable such that the operator may select different operating voltages for the tube. A summing means 66 subtractively combines the reference and sensed voltage to determine a difference therebetween. A correction algorithm means 68 adjusts a duty cycle with which the transistors of the first inverter are operated in accordance with the difference between the sensed and reference voltages. In the preferred embodiment, the gain of an amplifier for amplifying the difference signal is set in accordance with:

$$\text{Gain} = k + k'\frac{ma}{kV}. \tag{1}$$

That is, the gain with which the difference signal is amplified is set equal to a system dependent constant k plus a second system dependent constant k' times the ratio of the selected operating current to the selected operating voltage of the x-ray tube.

In the preferred embodiment, the x-ray tube can be operated in either a "radiographic" or "fluoroscopic" mode. A fluoroscopic/radiographic selecting means 70 controls the position of a switching means 72 such that the voltage difference signal is operated on either by a fluoroscopic mode amplifier 74 or the algorithm means 68 and a radiographic mode amplifier 76. The fluoroscopic and radiographic mode amplifiers adjust the gain or make other appropriate adjustments in the difference signal to effect appropriate adjustment the operating parameters of the x-ray tube D.

An oscillator 80 provides a high frequency oscillating reference. In the preferred embodiment, the oscillator has two modes of frequencies, one for the fluoroscopic mode and the other for the radiographic mode. A pulse width modulator 82 creates a pulse train of square wave pulses having a frequency set by the oscillator 80. The duty cycle, i.e. the relative duration of each pulse, is set in accordance with the voltage difference signal from switch 72. More specifically, the duty cycle or pulse width is adjusted such that the difference between the reference and sensed voltages is brought to and kept at zero. A driver circuit 84 applies the pulses from the pulse width modulator 82 to the bases of the transistors 30*a*, 30*b*, 30*c*, and 30*d* of the first inverter B. In this manner, the duty cycle of the pulse width modulator, hence the duration of the voltage pulses applied to primary windings 46*a*, 46*b* is increased when the tube voltage falls below a preselected voltage and decreased in response to the tube voltage increases above the preselected voltage.

A pulsed current is applied to the filament cathode 54 of the x-ray tube by the second or cathode current inverter F. In the preferred embodiment, the current inverter is a half-bridge inverter. That is, a power FET 90*a* is connected parallel to a snubber circuit 92*a* to the positive output of a DC power supply 94. A second power FET 90*b* and a second snubber circuit 92*b* are connected to the negative output of the DC power supply 94. A transformer 96 interconnects the inverter F with the cathode filament 54.

The tube current feed back sensor G includes a cathode current sensor 100 which is interconnected with the diode bridges 50 and 52 to monitor or sense the actual tube current. A comparing means 102 compares the actual sensed tube current with a reference tube current from a reference current indicator means 104 to determine a difference therebetween. A pulse width modulator 106 creates a train of square wave pulses with a 20 kHz frequency set by an oscillator 108. The duty cycle or duration of the pulses is selected in accordance with the difference between the measured and selected tube currents so as to maintain the sensed tube current in substantial conformity with the reference tube current. A line driver 110 applies the pulse train from the pulse width modulator to the gates of the second inverter transistors 90*a*, 90*b*.

Optionally, the x-ray tube D may have two filaments 54*a*, 54*b* to provide high and low tube current operating ranges. For x-ray tubes with two cathode filaments, a third inverter 120 of the same structure as the second inverter is provided. The tube current sensing circuit 100 may have separate sensor for each filament or may have amplifiers or other signal adjusting means for accommodating the difference signal to the two filaments. A second filament difference determining means 122 determines the difference between a sensed current and a reference current and sets the duty cycle of a second pulse width modulator 126 accordingly. A line driver 130 applies the pulse train from the second pulse width modulator 126 to the second filament current inverter 120.

Figure 2:
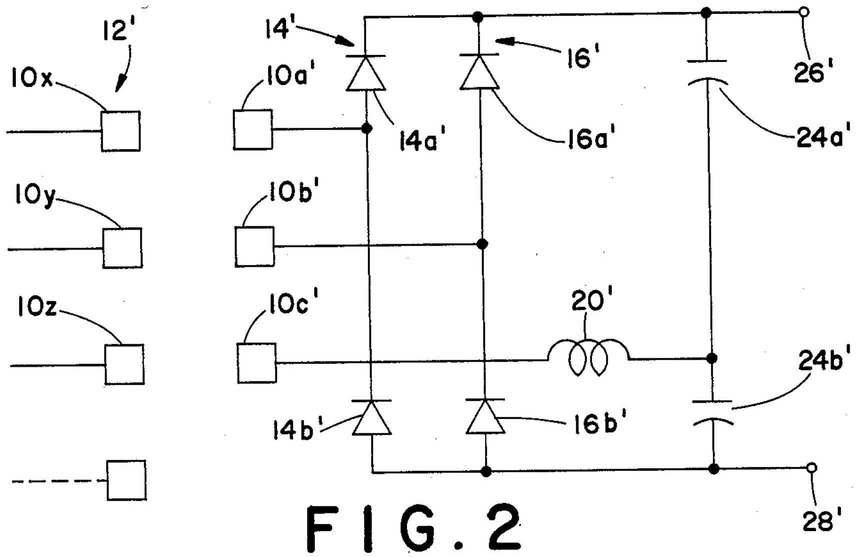
FIG. 2 illustrates an alternate embodiment of an AC-to-DC converter in accordance with the present invention in which line voltage is doubled.

In the alternate voltage doubling embodiment of FIG. 2, like components with the AC-to-DC converter of FIGS. 1A and 1B are denoted with like reference numerals but followed by a prime ('). The converter includes three coupling terminals or posts 10*a*', 10*b*', and and 10*c*'. Leads carrying the line signal may be connected with like terminal posts 10*x*, 10*y*, 10*z*. Jumper connections which interconnect with the terminal post manually without tools may be provided for selectively interconnecting appropriate posts in accordance with FIGS. 2A–2D. The first connection post 10*a*' is interconnected between a first pair of diodes 14' in a half bridge arrangement and the second connection post 10*b*' is connected between a second pair of diodes 16' in a half bridge arrangement. The third terminal 10*c*' is connected in series with an inductor or coil 20' and a pair of capacitances 24*a*'. 24*b*'. One end of each diode bridge and one of the capacitors are connected with a positive output terminal 26'. The other end of each diode bridge and the other capacitor is connected with a negative output terminal 28'.

Figure 2A:
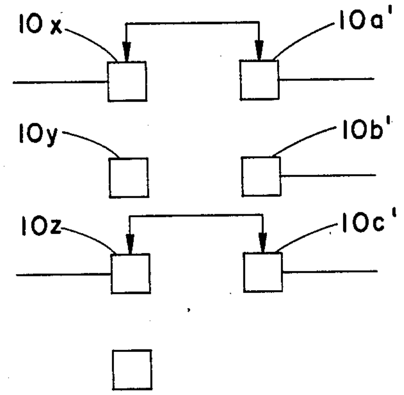
FIGS. 2A and 2B illustrate lead diagrams for two wire single phase line signals; and, FIGS. 2C and 2D illustrate lead connections for three and four wire, respectively, three phase line signals.
Figure 2B:
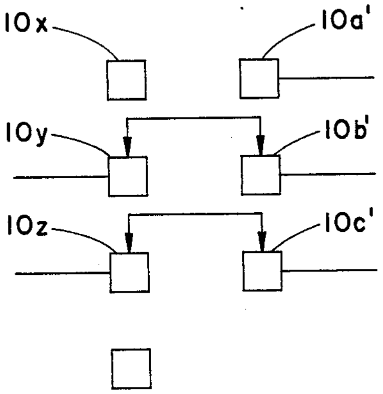

With reference to FIGS. 2A and 2B, when a single phase line signal is received on two leads, one of the leads is connected with the third terminal 10*c*' and the other lead is connected with one of the first and second terminals 10*a*' or 10*b*'.

Figure 2C:
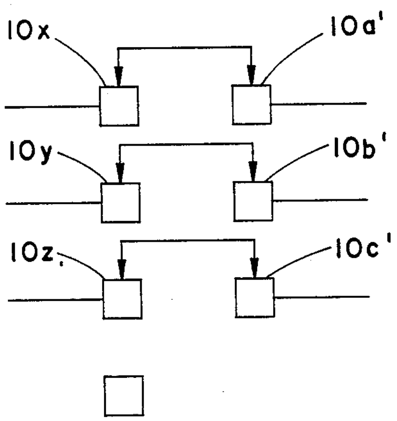
Figure 2D:
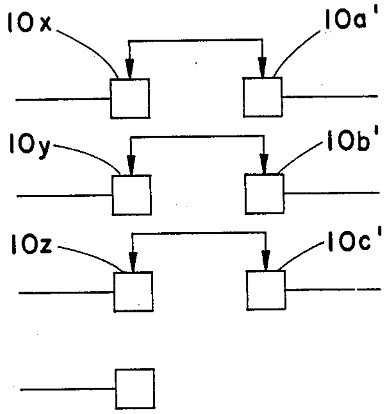

With reference to FIG. 2C, when a three phase signal is received on a three lead line, the three leads are connected with the first, second, and third terminals. With reference to FIG. 2D, when a three phase signal is received on a four lead line, the neutral of the supply leads is not connected.

The invention has been described with reference to the preferred embodiment. Obviously, modifications and alterations will occur to others upon reading and understanding the preceding detailed description. It is intended that the invention be construed as including all such alterations and modifications insofar as they come within the scope of the appended claims or the equivalents thereof.

Having thus described the preferred embodiment, the inventionis now claimed to be:

1. A radiographic tube control circuit for a radiographic tube having an anode and a cathode, the control circuit comprising:

a closed current loop including:

a tube current sensing means for sensing actual current between the anode and cathode, a current comparing means for comparing the sensed actual current with a preselected reference current and generating a current deviation signal in accordance therewith, a current control means for controlling the cathode current in accordance with the current deviation signal;

a closed voltage loop which inherently interacts with the closed current loop, the closed voltage loop including:

a voltage sensing means for sensing actual voltage across the cathode and anode, a voltage comparing means for comparing the sensed voltage with a reference voltage and generating a voltage deviation signal in accordance therewith, a voltage control means for controlling the voltage across the anode and cathode in accordance with the voltage deviation signal; and, a compensating means operatively connected with the closed current loop and the closed voltage loop for compensating for the inherent interaction therebetween.

2. The circuit as set forth in claim 1 wherein the compensating means includes a correction algorithm means which adjusts at least one of the current deviation signal and the voltage deviation signal in accordance with the reference current and the reference voltage.

3. The circuit as set forth in claim 1 further including a filament current means for applying an oscillating current through a filament of the cathode, the filament current means being operatively connected with the current control means.

4. The circuit as set forth in claim 3 wherein the current control means includes a pulse width modulator means operatively connected with the current comparing means for controlling a duty cycle of the oscillating current through the filament in accordance with the current deviation signal.

5. The control circuit as set forth in claim 4 wherein the filament current means includes an inverter controlled by the pulse width modulator means for supplying a pulsed AC current with the controlled duty cycle.

6. The circuit as set forth in claim 1 wherein the voltage control circuit includes:

a pulse width modulator means for generating an oscillating signal whose duty cycle varies in accordance with the voltage deviation signal; and, an inverter operatively connected with the voltage pulse width modulator means to be controlled with the oscillating signal therefrom and with a DC power source for providing DC voltage across the anode and cathode.

7. The control circuit as set forth in claim 6 further including a step up transformer operatively connected with the inverter, the step up transformer including:

primary and secondary windings; and, a Faraday shield disposed adjacent the secondary windings.

8. The control circuit as set forth in claim 6 further including:

a first primary transformer winding operatively connected with the inverter;

a first pair of oppositely wound secondary windings, the secondary windings being connected across opposite terminals of a full bridge rectifier;

another terminal of the full bridge rectifier being operatively connected with the anode; and, a Faraday shield disposed adjacent the secondary windings, the Faraday shield being operatively connected with another terminal of the full wave rectifier.

9. The control circuit as set forth in claim 8 further including:

a second primary transformer winding operatively connected with the inverter;

a second pair of secondary windings wound opposite to each other, the second pair being connected in series across opposite terminals of a second full bridge rectifier;

another terminal of the second full bridge rectifier being operatively connected with the cathode; and, a Faraday shield disposed adjacent the secondary windings, the Faraday shield being operatively connected with a further terminal of the second full wave rectifier.

10. The control circuit as set forth in claim 6 further including:

an amplifier means operatively connected between the second comparing means and the pulse width modulator means for altering the deviation signal in accordance with a ratio of the reference tube voltage and the reference tube current.

11. The control circuit as set forth in claim 6 further including a transformerless AC-to-DC converter for converting single or three phase line current having any one of a plurality of voltages to a preselected DC voltage.

12. A radiographic tube control circuit for a radiographic tube having an anode and a cathode, the control circuit comprising:

a transformerless AC-to-DC converter means for converting AC line voltage having any one of at least two preselected voltages and being one of single and three phase into a preselected DC voltage;

an inverter operatively connected with the AC-to-DC converter means for converting the preselected DC voltage into pulsed AC;

a step up transformer operatively connected with the inverter;

a rectifier means operatively connected with the step up transformer for rectifying electrical potential therefrom, the rectifier means being operatively connected with the anode and cathode, whereby a preselected voltage is applied across the anode and cathode from line voltage of any one or the plurality of voltages and phases.

13. The circuit as set forth in claim 12 wherein the AC-to-DC converter means includes a plurality of terminals which are selectively connectable with leads that carry the line voltage.

14. The control circuit as set forth in claim 13 wherein the plurality of terminals includes a first terminal, a second terminal, a third terminal, and a fourth terminal, the third and fourth terminals being selectively interconnectable when the line voltage is of a lower voltage and being selectively disconnectable when the line voltage is of a higher voltage.

15. The control circuit as set forth in claim 14 wherein a single phase line voltage is applied across a first and third terminals and wherein the three phase line signal is applied to the first, second, and third terminals.

16. The control circuit as set forth in claim 13 wherein the AC-to-DC converter means further includes a first diode pair connected with the first terminal, a second diode pair connected with the second terminal, a third diode pair connected with the third terminal, a first inductor connected with the first, second, and third diode pairs, a second inductor connected with the first, second, and third diode pairs, and a pair of capacitors, a first capacitor of the capacitor pair being operatively connected with the fourth terminal and the first inductor and a second capacitor of the capacitor pair being operatively connected between the fourth terminal and the second inductor, the capacitor pair being operatively connected with the inverter.

17. A radiographic tube control circuit for a radiographic tube having an anode and a cathode, the control circuit comprising:

a DC power supply means for supplying DC power;

an inverter operatively connected with the DC power supply means for providing pulsed AC current;

a step up transformer having a first primary winding wound with a first phase operatively connected with the inverter, the step up transformer further including a first pair of series connected secondary windings wound with opposite phase such that voltages induced across the secondary windings additively combine, whereby the opposite phase first secondary winding pair doubles the output voltage, the first secondary winding pair being operatively connected with the anode.

18. The control circuit as set forth in claim 17 further including at least one Faraday shield means mounted adjacent the first pair of secondary windings for controlling a path of capacitive current.

19. The control circuit as set forth in claim 17 further including a second primary winding having a second phase, which second phase is opposite to the first phase and a second pair of secondary windings, the windings of the second secondary winding pair having opposite phase to each other, the second secondary winding pair being operatively connected with the cathode.

20. The control circuit as set forth in claim 19 further including:

a first rectifier means having a first pair of inputs operatively connected with the first secondary winding pair, a positive terminal which is operatively connected with the anode, and a negative terminal; and, a secondary rectifier means having a second pair of inputs operatively connected with the second secondary winding pair, a positive terminal, and a negative terminal operatively connected with the cathode.

21. The control circuit as set forth in claim 20 further including:

a voltage sensor operatively connected with the first rectifier means positive terminal and the second rectifier means negative terminal for sensing a voltage therebetween;

a comparing means for comparing the sensed voltage with a reference voltage; and, a pulse width modulator means operatively connected with the comparing means and with the inverter means for modulating a duty cycle of the pulsed AC current produced by the inverter in accordance with a difference between the sensed and reference voltages.

22. The apparatus as set forth in claim 20 further including:

a first Faraday shield means disposed adjacent the first secondary winding pair, the first Faraday shield means being operatively connected with the first rectifier means negative terminal; and, a secondary Faraday shiel means disposed adjacent the second secondary winding pair, the second Faraday shield means being operatively connected with the second rectifier means positive terminal.

23. The control circuit as set forth in claim 20 further including:

a current sensor operatively connected with the first rectifier means negative terminal and the second rectifier means positive terminal for producing a tube current signal indicative of current flowing between the cathode and anode;

a comparing means for comparing the sensed current with a reference current; and, a pulse width modulator means operatively connected with the comparing means for controlling a second inverter to generate a second pulsed AC signal with a duty cycle varied in accordance with the difference between the sensed and reference currents, the second inverter being operatively connected with a filament of the cathode to apply the second pulsed AC current thereacross.

24. The radiographic tube control circuit for a radiographic tube having an anode and a cathode, the control circuit comprising:

a DC supply means for supplying power;

an inverter operatively connected with the DC power means for supplying a pulsed AC signal with an adjustable duty cycle;

a step up transformer operatively connected with the inverter, the step up transformer being operatively connected with the anode and cathode;

a tube voltage sensing means for sensing a voltage indicative of voltage across the anode and cathode;

a comparing means for comparing the sensed voltage with a reference voltage to produce a deviation signal indicative of the deviation therebetween;

a deviation signal adjusting means for adjusting the deviation signal in accordance with a selected tube operating current;

a pulse width modulator means operatively connected with the deviation signal adjusting means and the inverter for adjusting the duty cycle of the pulsed AC signal in accordance with the adjusted deviation signal.

* * * * *